US012808117B2

(12) United States Patent
Abe et al.

(10) Patent No.: US 12,808,117 B2
(45) Date of Patent: Nov. 24, 2026

(54) DYEING SYSTEM

(71) Applicant: NIDEK CO., LTD., Gamagori (JP)

(72) Inventors: Koji Abe, Gamagori (JP); Minoru Inuzuka, Gamagori (JP); Ryoji Shibata, Gamagori (JP); Motoshi Tanaka, Gamagori (JP); Shigenobu Nakamura, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 602 days.

(21) Appl. No.: 18/359,109

(22) Filed: Jul. 26, 2023

(65) Prior Publication Data

US 2023/0366148 A1 Nov. 16, 2023

Related U.S. Application Data

(63) Continuation of application No. PCT/JP2021/048849, filed on Dec. 28, 2021.

(30) Foreign Application Priority Data

Jan. 29, 2021 (JP) ................................ 2021-012836

(51) Int. Cl.
*D06P 5/20* (2006.01)
*B29D 11/00* (2006.01)

(52) U.S. Cl.
CPC ...... *D06P 5/2072* (2013.01); *B29D 11/00903* (2013.01); *B29D 11/0098* (2013.01); *D06P 5/2011* (2013.01)

(58) Field of Classification Search
None
See application file for complete search history.

(56) References Cited

U.S. PATENT DOCUMENTS

2003/0063256 A1* 4/2003 Inuzuka ........... B29D 11/00009 351/159.66
2004/0006835 A1* 1/2004 Kubodera ........ B29D 11/00903 8/507

(Continued)

FOREIGN PATENT DOCUMENTS

JP 2006-249597 A 9/2006
JP 2009-244515 A 10/2009

(Continued)

OTHER PUBLICATIONS

International Search Report (PCT/ISA/210) dated Mar. 22, 2022, issued by the International Searching Authority in counterpart International Application No. PCT/JP2021/048849.

(Continued)

*Primary Examiner* — Shawn Mckinnon
(74) *Attorney, Agent, or Firm* — Sughrue Mion, PLLC

(57) ABSTRACT

A dyeing system includes a transport device that transports a transport unit including a resin body, a transfer device that transfers a dye to the resin body in a state where a base body to which the dye is adhered faces the resin body, a laser fixing device that heats the resin body to which the dye is transferred by irradiating a surface of the resin body with laser light, an oven fixing device that heats a whole of the resin body to which the dye is transferred by the transfer device, a laser-applied transport path through which the transport unit including the resin body on which the dye is to be fixed by the laser fixing device is transported, and an oven-applied transport path through which the transport unit including the resin body on which the dye is to be fixed by the oven fixing device is transported.

8 Claims, 3 Drawing Sheets

(56) References Cited

U.S. PATENT DOCUMENTS

| | | | | |
|---|---|---|---|---|
| 2011/0018175 | A1 | 1/2011 | Inuzuka et al. | |
| 2012/0015111 | A1 | 1/2012 | Mishina et al. | |
| 2012/0023684 | A1 | 2/2012 | Inuzuka et al. | |
| 2013/0008374 | A1 | 1/2013 | Ookubo et al. | |
| 2018/0119340 | A1* | 5/2018 | Inuzuka | B29D 11/00923 |
| 2019/0093282 | A1 | 3/2019 | Inuzuka | |
| 2020/0278477 | A1* | 9/2020 | Tezuka | B05D 7/02 |

FOREIGN PATENT DOCUMENTS

| | | | |
|---|---|---|---|
| JP | 2012-031537 | A | 2/2012 |
| JP | 2016-40423 | A | 3/2016 |
| JP | 2018-127722 | A | 8/2018 |
| JP | 2018-132782 | A | 8/2018 |
| WO | 2010/090235 | A1 | 8/2010 |
| WO | 2020/031469 | A1 | 2/2020 |

OTHER PUBLICATIONS

Written Opinion (PCT/ISA/237) dated Mar. 22, 2022, issued by the International Searching Authority in counterpart International Application No. PCT/JP2021/048849.

Communication dated Nov. 18, 2024, issued by European Patent Office in European Patent Application No. 21923298.0.

* cited by examiner

DYEING SYSTEM

CROSS-REFERENCE TO RELATED APPLICATIONS

This is a continuation application of International Application No. PCT/JP2021/048849 filed on Dec. 28, 2021 which claims priority from Japanese Patent Application No. 2021-012836 filed on Jan. 29, 2021. The entire contents of the earlier applications are incorporated herein by reference.

TECHNICAL FIELD

The present disclosure relates to a dyeing system that dyes a resin body.

BACKGROUND ART

Various techniques for dyeing a resin body such as a plastic lens have been proposed. For example, in a dyeing method called an immersion dyeing method, the resin body is dyed by immersing the resin body in a dyeing solution. However, in the immersion dyeing method, it is difficult to improve a working environment, and it is difficult to dye a kind of the resin body (for example, a lens having a high refractive index).

Therefore, there has been proposed a technique that dyes a resin body by heating the resin body to which a dye is adhered to transfer the dye to a surface of the resin body. For example, in a dyeing method described in JP2018-127722A, a sublimating dye is applied (printed) to a base body by an ink jet printer. Next, the sublimating dye applied to the base body is sublimated in a state where a resin body and the base body are disposed in a vacuum in a non-contact manner, whereby the dye is transferred to the resin body. Next, the resin body is scanned with laser light, whereby a surface of the resin body is heated and the dye is fixed. In a dyeing method described in JP2018-132782A, a resin body is heated by an oven, whereby a dye is fixed on the resin body.

In a case where a dye is fixed on a resin body by laser light, the period of time required for the fixing step is easily shortened as compared with a case where the oven is used. In addition, in the case where the oven is used, for example, there is an advantage that it is easy to appropriately fix the dye on the resin body regardless of a type of a substrate of the resin body, a color to be dyed, and the like. In the method in the related art, since only one of the laser light and the oven is used when a dye is fixed on a resin body, it is difficult to sufficiently improve the efficiency of the dyeing step.

SUMMARY OF INVENTION

A typical object of the present disclosure is to provide a dyeing system capable of more appropriately dyeing a resin body.

A dyeing system provided by a typical embodiment of the present disclosure is a dyeing system that dyes a resin body, the dyeing system includes: a transport device configured to transport a transport unit including a resin body; a transfer device configured to transfer a dye to the resin body of the transport unit transported by the transport device, in a state where a base body to which the dye is adhered faces the resin body; a laser fixing device configured to heat the resin body to which the dye is transferred by the transfer device by irradiating a surface of the resin body with laser light, to fix the dye adhered to the surface of the resin body on the resin body; an oven fixing device configured to heat a whole of the resin body to which the dye is transferred by the transfer device, to fix the dye adhered to the surface of the resin body on the resin body; a laser-applied transport path through which the transport unit including the resin body, to which the transfer device completes the transfer of the dye and on which the dye is to be fixed by the laser fixing device, is transported; and an oven-applied transport path through which the transport unit including the resin body, to which the transfer device completes the transfer of the dye and on which the dye is to be fixed by the oven fixing device, is transported.

According to the dyeing system of the present disclosure, the resin body is more appropriately dyed.

The dyeing system exemplified in the present disclosure includes the transport device, the transfer device, the laser fixing device, the oven fixing device, the laser-applied transport path, and the oven-applied transport path. The transport device transports the transport unit including the resin body. The transfer device transfers the dye to the resin body of the transport unit transported by the transport device in a state where the base body to which the dye is adhered faces the resin body. The laser fixing device heats the resin body to which the dye is transferred by the transfer device by irradiating a surface of the resin body with laser light, to fix the dye adhered to the surface of the resin body on the resin body. The oven fixing device heats the whole of the resin body to which the dye is transferred by the transfer device, to fix the dye adhered to the surface of the resin body on the resin body. The transport unit including the resin body, to which the transfer device completes the transfer of the dye and on which the dye is to be fixed by the laser fixing device, is transported to the laser-applied transport path. The transport unit including the resin body, to which the transfer device completes the transfer of the dye and on which the dye is to be fixed by the oven fixing device, is transported to the oven-applied transport path.

According to the dyeing system of the present disclosure, the transport unit is transported from the transfer device to either the laser fixing device or the oven fixing device via the laser-applied transport path or the oven-applied transport path. That is, the dyeing system of the present disclosure may perform a fixing step by either the laser fixing device or the oven fixing device. Therefore, it is easy to improve the efficiency of a dyeing step as compared with a case where only one of the laser fixing device and the oven fixing device is used.

The dyeing system may further include a printing device. The printing device prints the dye on the base body. In this case, the dye is transferred, to the resin body, from the dye-adhered base body in which at least one of an amount, a density, and a distribution of the dye is appropriately adjusted by the printing device, and then is fixed on the resin body. Therefore, the dyeing quality of the resin body is appropriately improved.

In addition, in the present disclosure, as a transfer method for transferring a dye to a resin body, a phase transfer method is exemplified in which a sublimating dye printed on a base body is sublimated in a state where the resin body and the dye-adhered base body face each other in a vacuum in a non-contact manner, thereby transferring the dye to the resin body. However, the transfer method may be changed. For example, the dye may be transferred to the resin body in a state where the dye-adhered base body is in contact with the resin body.

The transport device may automatically transport the transport unit to the laser fixing device through the laser-applied transport path. In this case, an operator does not need to transport the transport unit from the transfer device to the laser fixing device by himself/herself. Therefore, the efficiency of the dyeing step is further improved.

In addition, the transport device may automatically transport the transport unit to the oven fixing device through the oven-applied transport path. In this case, the operator does not need to transport the transport unit from the transfer device to the oven fixing device by himself/herself. Therefore, the efficiency of the dyeing step is further improved.

At least one of the laser-applied transport path and the oven-applied transport path may be provided in the transport device. That is, the transport device may include at least one of the laser-applied transport path and the oven-applied transport path. In this case, the transport device may include the laser-applied transport path and the oven-applied transport path. In addition, the transport device may include the laser-applied transport path. In addition, the transport device may include the oven-applied transport path. With such a configuration, the transport unit is appropriately transported on the transport path of the transport device. As a method of transporting the transport unit, for example, a transport method by a belt conveyor or the like, or a transport method by a robot arm or the like can be appropriately selected.

The dyeing system may further include a distribution unit configured to distribute the transport unit, for which the transfer of the dye by the transfer device is completed, to either the laser-applied transport path or the oven-applied transport path. In this case, even when the operator does not distribute a transport destination of the transport unit, the transport unit is distributed to either the laser-applied transport path or the oven-applied transport path. Therefore, the efficiency of the dyeing step is further improved.

The dyeing system may further include a controller. The controller may acquire a condition of the dyeing step for each transport unit and distribute the transport unit to either the laser-applied transport path or the oven-applied transport path in accordance with the acquired condition. In this case, each transport unit is appropriately distributed to an appropriate transport path, of the laser-applied transport path and the oven-applied transport path, according to the condition of the dyeing step. Therefore, the efficiency of the dyeing step is further improved.

However, the controller may determine whether the transport unit is suitable for laser fixing or oven fixing in accordance with to the condition of the dyeing step acquired for each transport unit, and output a determination result. In this case, the operator can appropriately distribute the transport unit to any one of the transport paths based on the output determination result. As a method for outputting the determination result, for example, at least one of display on a display unit, printing on paper or the like, and data transfer can be adopted.

The controller may distribute the transport unit in accordance with a condition as to whether at least one of the resin body included in the transport unit and the color planned to be dyed on the resin body is suitable for fixing the dye by the laser fixing device. That is, the controller may distribute the transport unit to the laser-applied transport path in a case where at least one of the resin body included in the transport unit and the color planned to be dyed is suitable for laser fixing. The controller may distribute the transport unit to the oven-applied transport path in a case where at least one of the resin body included in the transport unit and the color planned to be dyed is not suitable for laser fixing.

As described above, according to the laser fixing device, the period of time required for the fixing step is easily shortened. However, it may be impossible or difficult to fix the dye by the laser fixing device depending on the resin body. In addition, it may be impossible or difficult to fix the dye by the laser fixing device depending on the color planned to be dyed on the resin body (for example, at least one of the type and the density of the color planned to be dyed). Generally, in a case where the density of the color planned to be dyed on the resin body is high, it is more difficult to fix the dye by the laser fixing device as compared with a case where the density is low. According to the oven fixing device, since the temperature of the resin body gradually increases over a long period of time, a temperature difference among portions of the resin body hardly occurs. Thus, according to the oven fixing device, the dye is easily appropriately fixed on the resin body. In addition, the possibility of breakage or the like occurring in the resin body due to the temperature difference also decreases. In a case where the transport unit is distributed in accordance with whether the resin body is suitable for laser fixing, the resin body suitable for laser fixing is subjected to the fixing step by laser in a short period of time. On the other hand, the resin body not suitable for laser fixing is appropriately subjected to the fixing step by an oven. Thus, the efficiency of the dyeing step is appropriately improved.

The controller can determine whether the resin body is suitable for dye fixing by the laser fixing device based on various conditions. For example, the controller may determine whether the type of the substrate of the resin body is a substrate suitable for laser fixing. In addition, the controller may determine whether the shape of the resin body is a shape suitable for laser fixing. The controller may determine whether the density of the color planned to be dyed on the resin body is a density suitable for laser fixing. The controller may determine whether the resin body is suitable for laser fixing based on a plurality of conditions (for example, the type and the shape of the substrate).

The controller may distribute the transport unit in accordance with whether a period of time required for performing the fixing step by the laser fixing device is equal to or shorter than a threshold. That is, in a case where the period of time required for laser fixing of the resin body is equal to or shorter than the threshold, the controller may distribute the transport unit to the laser-applied transport path. In a case where the period of time required for laser fixing of the resin body is longer than the threshold, the controller may distribute the transport unit to the oven-applied transport path. In a case where the period of time required for the fixing step by the laser fixing device (laser fixing) becomes long, the number of the transport unit in a standby state before the laser fixing is performed may increase, and the period of time required for the entire dyeing step may become long. On the other hand, the resin body for which the period of time required for the laser fixing is longer than the threshold is distributed to the oven-applied transport path, whereby it is difficult to increase the number of the transport unit in the standby state for the laser fixing. Thus, a plurality of resin bodies are dyed more efficiently.

The controller may distribute the transport unit in accordance with an operation state of the laser fixing device. In this case, it is difficult to increase the number of the transport unit in the standby state for laser fixing. Thus, a plurality of resin bodies are dyed more efficiently.

A specific method for distributing the transport unit in accordance with the operation state of the laser fixing device can be appropriately selected. For example, in a case where the laser fixing device is in operation, the controller may distribute the transport unit to the oven-applied transport path. In addition, the controller may acquire standby time until the laser fixing step is performed by the laser fixing device as information on the operation state of the laser fixing step. In this case, the controller may distribute the transport unit to the laser-applied transport path in a case where the standby time until the laser fixing step is performed is equal to or shorter than the threshold, and may distribute the transport unit to the oven-applied transport path in a case where the standby time is longer than the threshold. In addition, the controller may distribute the transport unit in accordance with whether the number of the transport unit standing by for laser fixing is equal to or more than a threshold.

The oven fixing device may be capable of collectively performing the fixing step on resin bodies of a plurality of units, the number of which is larger than the number of units (for example, a pair of spectacle lenses) on which the laser fixing device may fix the dye in one fixing step. In this case, the oven fixing is collectively performed on the resin bodies of the plurality of units even in a case where a period of time is necessary to perform the fixing step by the oven fixing device, whereby the entire dyeing step proceeds smoothly.

The controller may start the fixing step by the oven fixing device for the resin bodies of the plurality of units in the standby state in a case where the number of units in the standby state for the fixing step by the oven fixing device reaches a predetermined number. In this case, the oven fixing for the resin bodies of the plurality of units is more efficiently and automatically performed.

The controller may perform a notification operation to the operator in a case where the number of the units in the standby state for the fixing step by the oven fixing device reaches a predetermined number. In this case, the operator can appropriately grasp, by the notification, the timing of starting the fixing step by the oven fixing device.

The dyeing system may include a reading unit configured to read information related to the transport unit. The controller may acquire a condition of the dyeing step for each transport unit based on the information read by the reading unit, and control driving of the distribution unit in accordance with the acquired condition. In this case, the transport unit is distributed to either the laser-applied transport path or the oven-applied transport path after the condition of the dyeing step is appropriately acquired for each transport unit. Thus, the plurality of resin bodies are automatically and appropriately dyed.

The reading unit may include an identifier reading unit configured to read an identifier provided for each transport unit. The controller may acquire, from a database that stores the condition of the dyeing step (dyeing condition) for each transport unit, a dyeing condition for the transport unit corresponding to the identifier read by the identifier reading unit. In this case, the dyeing condition for each transport unit is appropriately grasped by the controller, for example, even in a case where an order of the plurality of transport units is changed. The identifier may be provided on, for example, a dyeing tray on which the resin body is placed, or may be provided on the base body used in the transfer step.

In addition, the reading unit may include a tag reading unit configured to read information from a writable tag provided in the transport unit. The controller may acquire a dyeing condition included in the information read by the tag reading unit. In this case, by storing the dyeing condition in a tag in advance, the dyeing condition for each transport unit is appropriately grasped by the controller, for example, even in a case where the order of the plurality of transport units is changed.

The dyeing system may further include a color information measuring instrument configured to measure color information of the resin body on which the dye is fixed. The color information measuring instrument may measure color information of both the resin body on which the dye is fixed by the laser fixing device and the resin body on which the dye is fixed by the oven fixing device. In this case, a measurement result of the color information by the color information measuring instrument may be used, for example, for confirming a dyeing quality or improving the dyeing quality. In addition, the color information of both the resin body subjected to the laser fixing and the resin body subjected to the oven fixing is measured by a common color information measuring instrument. Therefore, the color information of the resin body is appropriately measured in a state where the configuration of the dyeing system is prevented from becoming complicated.

A specific method for using the measured color information can be appropriately selected. For example, the controller may perform an ejection amount determination step, a resultant color information acquisition step, and a correction step. In the ejection amount determination step, the controller determines, in accordance with a determination procedure, an ejection amount of the dye to the base body by the printing device in order to dye the resin body with a color planned to be dyed (desired color). In the resultant color information acquisition step, the controller uses the dye of the ejection amount determined in the ejection amount determination step to acquire resultant color information, which is color information measured by the color information measuring instrument, for the resin body actually dyed by the printing device, the transfer device, and the dye fixing device. In the correction step, the controller corrects the ejection amount of the dye determined in the ejection amount determination step based on the resultant color information and the desired color, thereby bringing the color of the resin body dyed in the subsequent dyeing step close to the desired color. In this case, since the ejection amount of the dye printed on the base body for dyeing the desired color is corrected in the subsequent dyeing step, the color of the resin body to be actually dyed appropriately approaches the desired color.

The controller may perform a pass/fail determination step and an error output step. In the pass/fail determination step, the controller determines whether a difference between the desired color and the resultant color information measured for the actually dyed resin body is within a threshold. In the error output step, the controller outputs an error in a case where the difference between the desired color and the resultant color information is not within the threshold and the desired color and a resultant color are greatly different. In this case, the resin body of which the quality of actually performed dyeing is not good is appropriately excluded.

DESCRIPTION OF EMBODIMENTS

Figure 1:
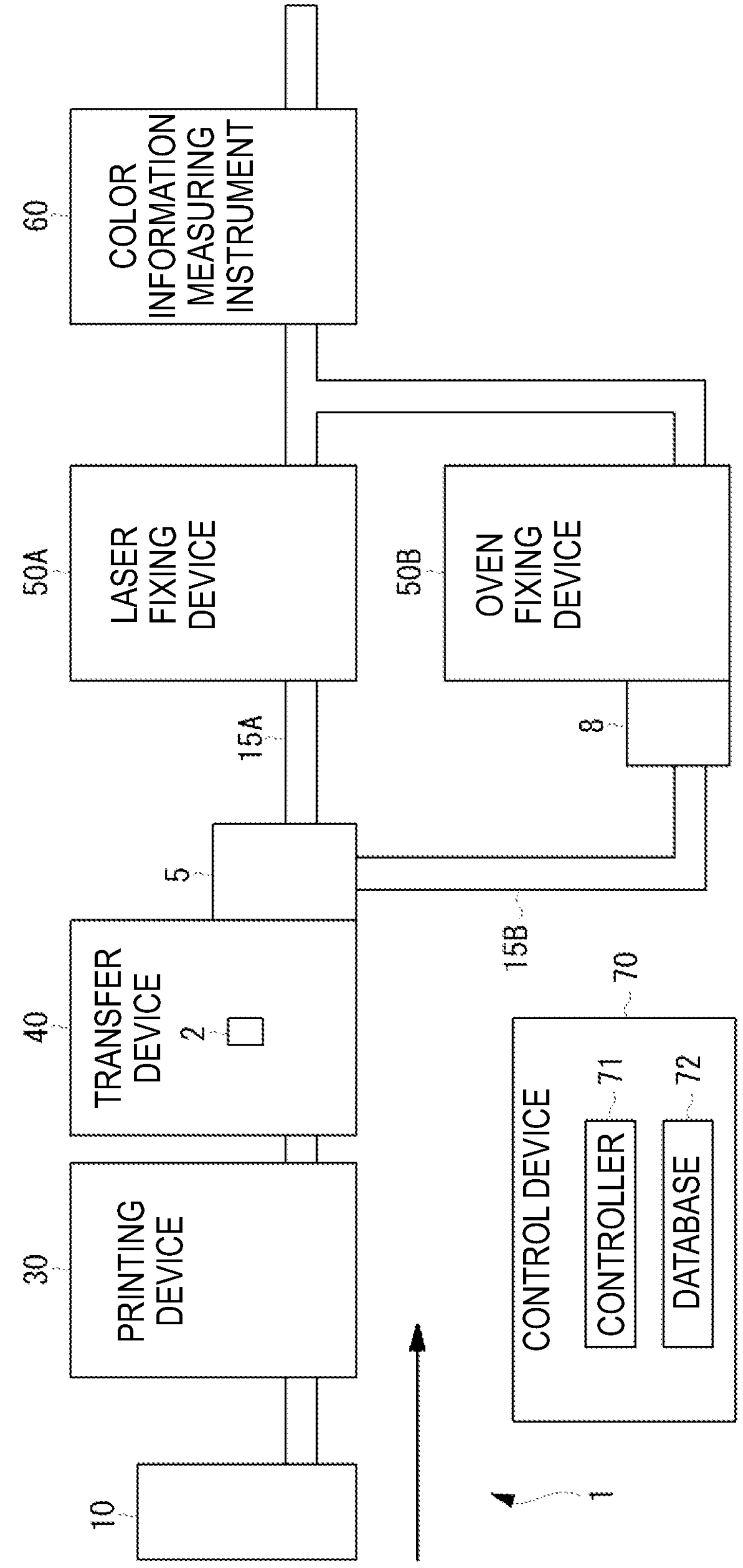
FIG. 1 is a block diagram showing a system configuration of a dyeing system 1.

Hereinafter, one of typical embodiments according to the present disclosure will be described with reference to the drawings. The dyeing system 1 automatically and continuously dyes a resin body. In the present embodiment, the resin body to be dyed is plastic lenses L (see FIG. 2 and the like) used for eyeglasses. However, at least a part of the techniques exemplified in the present disclosure can also be applied to a case where a resin body other than the lens L is dyed. For example, in a case where various resin bodies such as goggles, a cover of a mobile phone, a cover for light, an accessory, a toy, a film (for example, having a thickness of 400 μm or less), and a plate material (for example, having a thickness of 400 μm or more) are dyed, at least a part of the techniques exemplified in the present disclosure can also be applied. The resin body to be dyed also includes a resin body added to a member (for example, wood or glass) different from the resin body. In addition, the dyeing system 1 according to the present embodiment performs dyeing while continuously transporting a plurality of resin bodies. However, at least a part of the techniques exemplified in the present disclosure can also be adopted in a dyeing system in which resin bodies are dyed by being transported one set at a time.

(System Configuration)

A system configuration of the dyeing system 1 according to the present embodiment will be schematically described with reference to FIG. 1. The dyeing system 1 according to the present embodiment includes a transport device 10, a printing device 30, a transfer device 40, a laser fixing device 50A, an oven fixing device 50B, a color information measuring instrument 60, and a control device 70. The dyeing system 1 according to the present embodiment further includes a laser-applied transport path 15A, an oven-applied transport path 15B, a distribution unit 5, and an oven standby position 8.

The transport device 10 continuously transports a transport unit U (see FIG. 2) to each device in the dyeing system 1. The transport unit U is a unit transported by the transport device 10. The transport unit U according to the present embodiment includes a dyeing tray 80 (see FIG. 2) and lenses L placed on the dyeing tray 80. Further, the transport unit U may include a sheet-like base body (dye-adhered base body) having a surface to which a dye is adhered. The transport device 10 according to the present embodiment includes a belt conveyor that conveys the transport unit U along the transport path. However, the configuration of the transport device 10 may be changed. For example, the transport device 10 may include a robot arm or the like that grips and transports the transport unit U.

The printing device 30 prints a dye on the sheet-like base body. In the present embodiment, paper having an appropriate hardness or a metallic (in the present embodiment, aluminum) film is used as the base body. However, it is also possible to use other materials such as a glass plate, a heat-resistant resin, and ceramic as the material of the base body. In the dyeing system 1 according to the present embodiment, in order to appropriately transfer the dye to the lens L while preventing aggregation or the like of the dye, the dye of the base body is heated in a state where the base body and the lens L are separated from each other and face each other in a vacuum (including substantially vacuum) environment, whereby the dye is transferred (vapor-deposited) to the surface of the lens L (dyeing method in the present embodiment is referred to as a phase transfer dyeing method). Therefore, an ink jet printer that prints ink containing a sublimating dye on a base body is used as the printing device 30. The printing device 30 performs printing based on print data produced by the control device 70 which is an information processing device (in the present embodiment, a personal computer (hereinafter referred to as "PC")). As a result, an appropriate amount of ink (dye) is adhered to an appropriate position of the base body. It is also easy to produce a dye-adhered base body for gradational dyeing.

The configuration of the printing device 30 may be changed. For example, the printing device may be a laser printer. In this case, a toner may contain a sublimating dye. In addition, the dye may be adhered to the base body by a dispenser (liquid quantitative coating device), a roller, or the like instead of the printing device 30.

The transfer device 40 transfers the dye adhered to the base body from the base body to the lens L in a state of facing the lens L. As described above, in the present embodiment, the dye is transferred from the base body to the lens L by the phase transfer method. However, the method of transferring the dye to the lens L may be changed. For example, the dye may be transferred from the base body to the lens L in a state where the dye of the base body and the lens L are in contact with each other.

The laser fixing device 50A heats the lens L to which the dye is transferred by the transfer device 40 by irradiating the surface of the lens L with laser light, to fix the dye adhered to the surface of the lens L on the lens L. Specifically, the laser fixing device 50A according to the present embodiment includes a laser light source and a scanner. The laser light source emits laser light. The scanner scans the laser light emitted from the laser light source. The laser light is two-dimensionally scanned by the scanner on the surface of the lens L, thereby heating the surface of the lens L. The laser fixing device 50A according to the present embodiment performs the fixing step once for each transport unit U (that is, for one lens L or each of the pair of lenses L included in one transport unit U).

The laser fixing device 50A can fix the dye on the lens L in a shorter period of time as compared with the oven fixing device 50B. In addition, the laser fixing device 50A changes the irradiation condition with the laser light (for example, at least one of the period of time required for the fixing step by irradiation with the laser light, an output control condition for the laser light, and the like) in accordance with at least one of the type of the substrate of the lens L to be dyed, the shape of the lens L, and the like. It may be difficult to appropriately fix the dye on the lens L by the laser light depending on the type and the shape of the substrate of the lens L which is a resin body.

The oven fixing device 50B heats the whole of the lens L to which the dye is transferred by the transfer device 40, to fix the dye adhered to the surface of the lens L on the lens L. The oven fixing device 50B according to the present embodiment heats the entire lens L by heating an entire heating chamber (gas and the lens L in the heating chamber) in a state where the lens L is disposed inside the heating chamber.

According to the oven fixing device 50B, since the temperature of the lens L gradually increases over a long period of time, a temperature difference among portions of the lens L hardly occurs. Thus, according to the oven fixing device 50B, the dye is easily appropriately fixed on the lens L regardless of the type of the substrate of the lens L or the like.

In addition, the oven fixing device 50B according to the present embodiment can collectively perform the fixing step on N lenses L of a plurality of units, the number of which is larger than the number of units (in the present embodiment, one or a pair of lenses L included in one transport unit U)

capable of fixing the dye in one fixing step by the laser fixing device 50A. As a result, the entire dyeing step proceeds smoothly.

The color information measuring instrument 60 is used to measure color information of the lens L on which the dye is fixed. The color information measuring instrument 60 according to the present embodiment is a spectroscopic measuring instrument that measures a spectral spectrum (specifically, in the present embodiment, a transmission spectrum) of the lens L as the color information. Therefore, the color information is acquired in a state where an influence of ambient light such as an illumination environment is reduced as compared with a case where an RGB camera or the like is used. In addition, since the spectral spectrum which is the distribution of the density for each wavelength is acquired even in a case where the lens L is dyed using a plurality of dyes, the color information of the dyed lens L is appropriately acquired. By using data of the acquired spectral spectrum, values of a CIE L*a*b* color system, an XYZ color system, an L*C*h* color system, a Munsell color system, and the like may be used. However, a device other than the spectroscopic measuring instrument (for example, an RGB camera) may be used as the color information measuring instrument.

The color information measuring instrument 60 according to the present embodiment measures color information of both the lens L on which the dye is fixed by the laser fixing device 50A and the lens L on which the dye is fixed by the oven fixing device 50B. That is, the transport unit U through the laser fixing device 50A and the transport unit U through the oven fixing device 50B are transported to the same color information measuring instrument 60. In the present embodiment, the transport device 10 transports the transport unit U from each of the laser fixing device 50A and the oven fixing device 50B to the color information measuring instrument 60.

The transport unit U including the lens L, to which the transfer device 40 completes the transfer of the dye and on which the dye is to be fixed by the laser fixing device 50A, is transported to the laser-applied transport path 15A. The transport unit U including the lens L, to which the transfer device 40 completes the transfer of the dye and on which the dye is to be fixed by the oven fixing device 50B, is transported to the oven-applied transport path 15B.

The transport device 10 according to the present embodiment automatically transports the transport unit U to the laser fixing device 50A through the laser-applied transport path 15A. Further, the transport device 10 according to the present embodiment automatically transports the transport unit U toward the oven fixing device 50B (specifically, the oven standby position 8 to be described later) through the oven-applied transport path 15B. That is, the transport device 10 according to the present embodiment includes the laser-applied transport path 15A and the oven fixing device 50B. Therefore, the transport unit U is efficiently transported without an operator manually transporting the transport unit U.

However, a method of transporting the transport unit U to each of the laser fixing device 50A and the oven fixing device 50B may be changed. For example, the transport unit U transported to the oven-applied transport path 15B may be manually transported to the oven fixing device 50B by an operator. In addition, the transport unit U transported to the laser-applied transport path 15A may be manually transported to the laser fixing device 50A by an operator. The transport unit U may be manually transported to both the laser fixing device 50A and the oven fixing device 50B.

The distribution unit 5 automatically distributes the transport unit U including the lens L, for which the transfer of the dye by the transfer device 40 is completed, to either the laser-applied transport path 15A or the oven-applied transport path 15B. A specific configuration of the distribution unit 5 can be appropriately selected. For example, the distribution unit 5 may be a robot arm or the like that transports the transport unit U to either the laser-applied transport path 15A or the oven-applied transport path 15B. In addition, a switch (for example, a rail switch) that switches a transport direction of the transport unit U may be used as the distribution unit 5. A specific method for controlling the operation of the distribution unit 5 will be described later with reference to FIG. 3.

The oven standby position 8 is a position where the transport unit U including the lens L on which the dye is fixed by the oven fixing device 50B stands by. The oven standby position 8 is provided on the oven-applied transport path 15B. In the oven standby position 8 according to the present embodiment, N units (transport unit U) on which the oven fixing device 50B may fix the dye in one fixing step can be caused to standby.

The control device 70 performs various controls in the dyeing system 1. Various information processing devices (for example, at least one of a PC, a server, and a mobile terminal) can be used as the control device 70. The control device 70 includes a controller (for example, a CPU) 71 that performs control, and a database 72 that stores various data. The configuration of the control device 70 may be changed. First, a plurality of devices may cooperate to function as the control device 70. For example, a control device that performs various controls in the dyeing system 1 and a control device including the database 72 may be separate devices. In addition, controllers of the plurality of devices may cooperate with one another to perform various controls in the dyeing system 1. For example, in many cases, at least one of the transport device 10, the printing device 30, the transfer device 40, the laser fixing device 50A, and the oven fixing device 50B includes a controller. In this case, the controller of the control device 70 and a controller of another device may cooperate with each other to control the dyeing system 1.

The dyeing system 1 includes a reading unit 2 that reads information for each transport unit U (including the dyeing tray 80 and the lens L placed on the dyeing tray 80). As an example, the reading unit 2 according to the present embodiment is an identifier reading unit that reads an identifier provided for each transport unit U (for example, for each dyeing tray 80). The transport unit U is specified by the identifier read by the reading unit 2. By specifying the transport unit U, conditions and the like of the dyeing step for the lens L included in the transport unit U are acquired.

The reading unit 2 according to the present embodiment is an identifier reader (for example, a QR code (registered trademark) reader, a bar code reader, an identification hole reader, or the like) corresponding to an identifier that is used. In addition, the reading unit 2 may be a tag reading unit that reads information from a tag (for example, an IC tag) in which information may be written. In the present embodiment, the reading unit 2 is provided in the vicinity of at least the transfer device 40 among the plurality of devices constituting the dyeing system 1. However, the reading unit may be provided at a portion of the dyeing system 1 other than the transfer device 40.

(Transport Unit U and Dyeing Tray)

Figure 2:
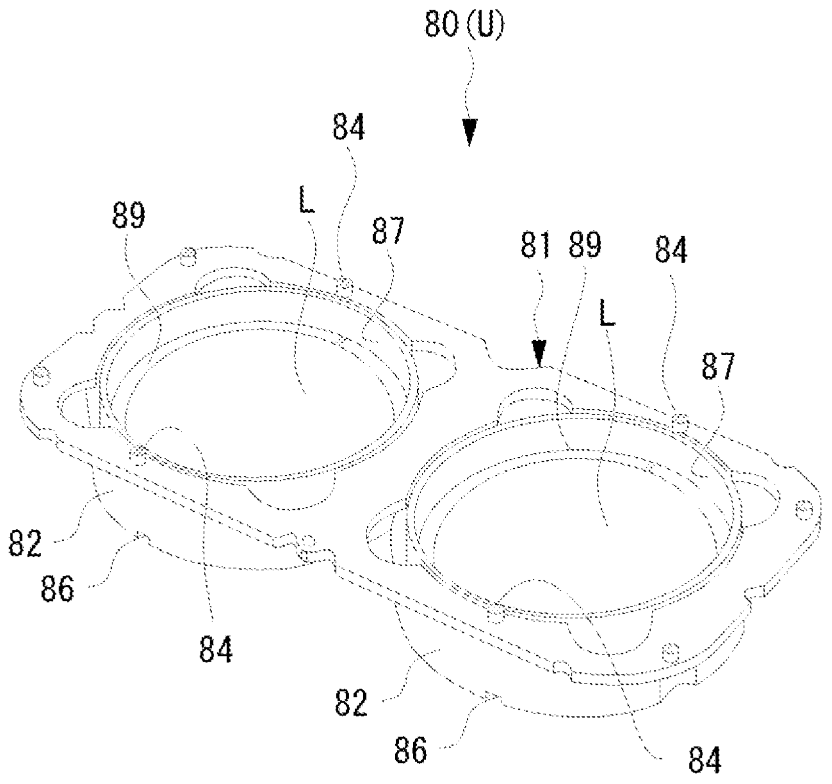
FIG. 2 is a perspective view of a dyeing tray 80 in a state where two lenses L are installed, as viewed obliquely from an upper right side.

The transport unit U and the dyeing tray 80 will be described with reference to FIG. 2. FIG. 2 is a perspective view of the dyeing tray 80 (transport unit U) in a state where two lenses L are installed (placed) and a base body is not installed. The dyeing tray 80 according to the present embodiment includes a tray main body 81, placement frames 89, and spacers 87. A resin body (in the present embodiment, the lens L) to be dyed is placed on each of the placement frame 89. The placement frame 89 according to the present embodiment is formed in a ring shape having an outer diameter slightly larger than the lens L. Each of the spacers 87 extends upward in a tubular shape (cylindrical shape) from an outer peripheral portion of a portion of the placement frame 89 on which the lens L is placed. Attachment portions 82 are formed at the tray main body 81. The placement frame 89 and the spacer 87 are detachably attached on the attachment portion 82. In the present embodiment, two attachment portions 82 are formed at one tray main body 81. Therefore, the pair of (right and left) lenses L used for one pair of glasses is dyed in a state of being placed on one dyeing tray 80.

Protruding portions 84 protruding upward are provided at positions in the tray main body 81 outside the attachment portion 82 (specifically, outside a base body placement portion 85). Bottom fitting portions 86, which are recessed portions recessed upward, are formed at a bottom portion of the tray main body 81 (in the present embodiment, two positions of the bottom portions of the respective attachment portions 82). When another dyeing tray 80 (tray main body 81) is stacked on an upper portion of the dyeing tray 80, four protruding portions 84 adjacent to the attachment portions 82, among the plurality of protruding portions 84 formed at an upper portion of the tray main body 81, are fitted to the respective bottom fitting portions 86 of the stacked dyeing trays 80. Thus, the plurality of dyeing trays 80 are stacked vertically in a stable state.

(Resin Body Distribution Process)

Figure 3:
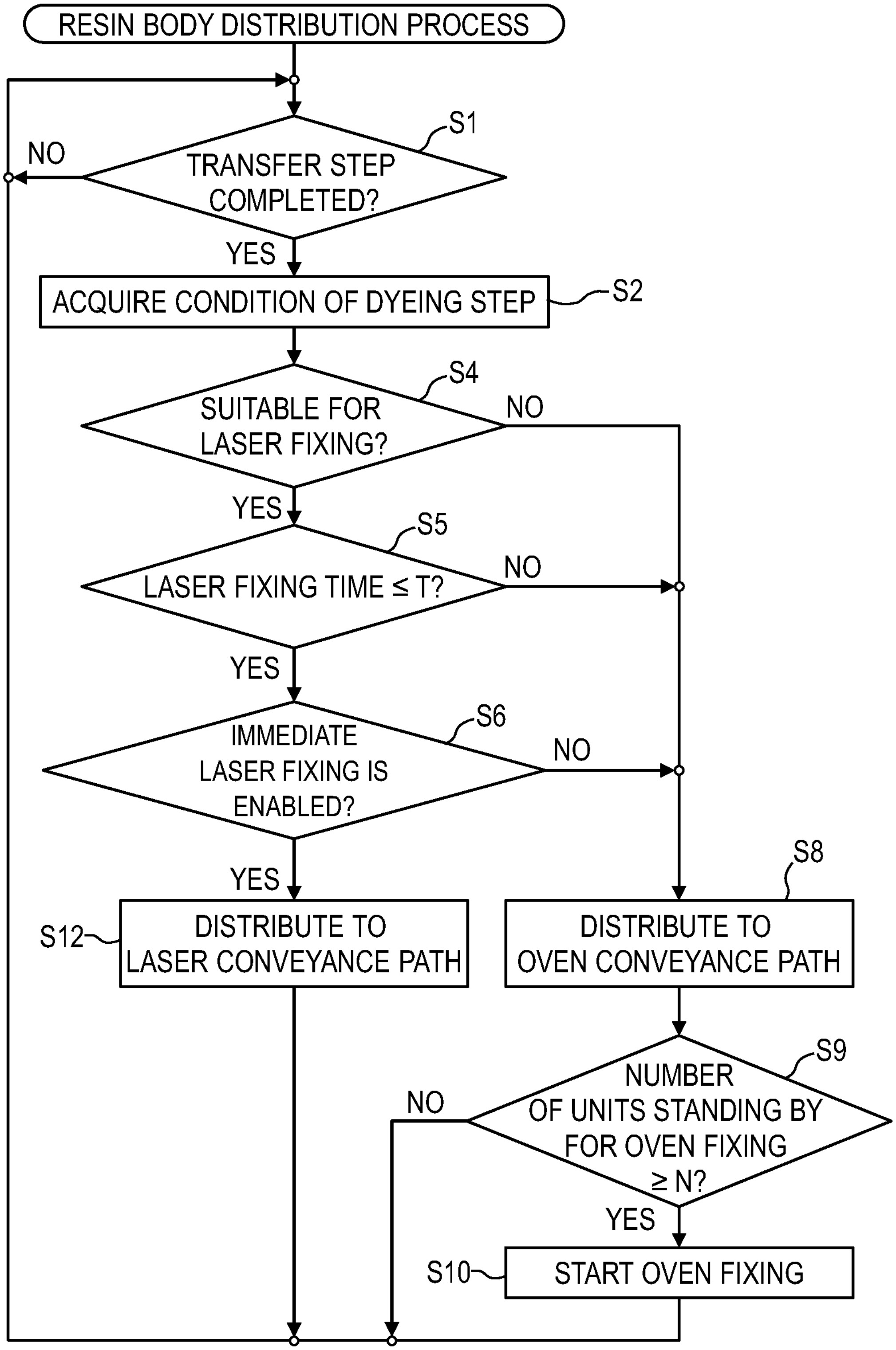
FIG. 3 is a flowchart of a resin body distribution process performed by the dyeing system 1.

A resin body distribution process performed by the controller 71 of the dyeing system 1 will be described with reference to FIG. 3. In the resin body distribution process, a process of distributing the lens L (transport unit U), for which the transfer device 40 completes a dye transfer step, to either the laser-applied transport path 15A or the oven-applied transport path 15B is performed. In a case where an instruction to start the dyeing step for the lens L is input, the controller 71 performs the resin body distribution process exemplified in FIG. 4 according to a program stored in a storage device.

First, the controller 71 determines whether the dye transfer step by the transfer device 40 is completed (S1). When the transfer step for the lens L of the transport unit U is not completed (S1: NO), the determination in S1 is repeated and the standby state is entered.

In a case where the transfer step for the lens L of the transport unit U is completed (S1: YES), the controller 71 acquires a condition of the dyeing step for the transport unit U (lens L) for which the transfer step is completed (S2). The condition of the dyeing step obtained in S2 can be appropriately selected. As an example, in the present embodiment, a condition as to whether being suitable for fixing of a dye by the laser fixing device 50A (suitability of laser fixing), the period of time required for the fixing step by the laser fixing device 50A is required (laser fixing time), and information on an operation state of the laser fixing device 50A (information on the operation state) are acquired as the conditions of the dyeing step.

Specifically, in the present embodiment, the controller 71 acquires the suitability of the laser fixing and the laser fixing time for each transport unit U based on the information read by the reading unit 2 (see FIG. 1). Information indicating suitability of laser fixing may be, for example, at least one of information indicating whether the type of the substrate of the lens L is suitable for laser fixing, information indicating whether the shape of the lens L is suitable for laser fixing, and information indicating whether the color planned to be dyed on the lens L (in the present embodiment, the density of the color) is suitable for laser fixing. In addition, the controller 71 acquires the information on the operation state of the laser fixing device 50A from the laser fixing device 50A and the like. The information on the operation state may be, for example, at least one of information indicating whether the laser fixing device 50A is in operation, information on standby time required until the fixing step by the laser fixing device 50A is performed, and information on the number of the transport unit U standing by for the fixing step by the laser fixing device 50A. A timing of acquiring the conditions of the dyeing step is not limited to after the completion of the transfer step for the lens L of the transport unit U. In addition, a plurality of conditions for one transport unit U may be acquired at different timings.

Next, the controller 71 controls the driving of the distribution unit 5 in accordance with the conditions of the dyeing step acquired in S2, thereby distributing the transport unit U for which the transfer step is completed to either the laser-applied transport path 15A or the oven-applied transport path 15B (S4 to S8 and S12).

Specifically, in the present embodiment, the controller 71 determines whether at least one of the lens L included in the transport unit U and the color planned to be dyed is suitable for fixing the dye by the laser fixing device 50A based on the condition acquired in S2 (S4). In a case of being not suitable for laser fixing (S4: NO), the controller 71 distributes the transport unit U to the oven-applied transport path 15B (S8).

In a case where at least one of the lens L of the transport unit U and the color planned to be dyed is suitable for laser fixing (S4: YES), the controller 71 determines whether the laser fixing time acquired in S2 is equal to or shorter than a threshold T (S5). In a case where the laser fixing time is longer than the threshold T (S5: NO), the number of the transport unit U in the standby state for laser fixing may increase, and the efficiency of the dyeing step may deteriorate. Therefore, the controller 71 distributes the transport unit U to the oven-applied transport path 15B (S8).

In a case where the laser fixing time for the lens L of the transport unit U is equal to or shorter than the threshold T (S5: YES), the controller 71 determines whether the fixing step by the laser fixing device 50A is useful (whether the immediate laser fixing is enabled) (S6). For example, in a case where the laser fixing device 50A is in operation, the controller 71 may determine that the immediate laser fixing is not enabled. In a case where the standby time required for laser fixing on the lens L of the transport unit U is longer than the threshold, the controller 71 may determine that the immediate laser fixing is not enabled. In a case the number of the transport unit U standing by for laser fixing is equal to or more than a threshold, the controller 71 may determine that the immediate laser fixing is not enabled. In a case where the immediate laser fixing is not enabled (S6: NO), the controller 71 distributes the transport unit U to the oven-applied transport path 15B (S8). In a case where the immediate laser fixing is enabled (S6: YES), the controller 71 distributes the transport unit U to the laser-applied transport path 15A (S12).

In a case where the transport unit U is distributed to the oven-applied transport path 15B (S8), the controller 71 determines whether the number of the transport unit U in the standby state for the fixing step by the oven fixing device 50B reaches a predetermined number (in the present embodiment, an upper limit N of the number of the transport unit U that may be processed in one fixing step by the oven fixing device) (S9). In a case where the predetermined number is not reached (S9: NO), the process returns to S1. In a case where the number of the transport unit U in the standby state for oven fixing reaches the predetermined number (S9: YES), the controller 71 starts the fixing step by the oven fixing device 50B for the N lenses L of the transport unit U in the standby state. In a case where it is determined in S9 that the predetermined number is reached, the controller 71 may execute a notification operation of notifying the operator of the fact.

The techniques disclosed in the above embodiment are merely examples. Therefore, it is also possible to change the technique exemplified in the above embodiment. For example, only a part of the techniques exemplified in the above embodiment may be adopted. As an example, in the above embodiment, the transport unit U on which the dye transfer step is completed is automatically distributed to either the laser fixing device 50A or the oven fixing device 50B by the distribution unit 5. However, the transport unit U may be manually distributed to either the laser fixing device 50A or the oven fixing device 50B by an operator. In this case, the operator appropriately distributes the transport unit U, thereby improving the efficiency of the dyeing step. In the resin body distribution process (see FIG. 3) of the above embodiment, the driving of the distribution unit 5 is controlled according to the suitability of laser fixing (S4), the laser fixing time (S5), and the information on the operation state (S6). However, it is needless to say that only a part of the processes of S4 to S6 may be adopted.

What is claimed is:

1. A dyeing system that dyes a resin body, the dyeing system comprising:

a transport device configured to transport a transport unit including a resin body;

a transfer device configured to transfer a dye to the resin body of the transport unit transported by the transport device, in a state where a base body to which the dye is adhered faces the resin body;

a laser fixing device configured to heat the resin body to which the dye is transferred by the transfer device by irradiating a surface of the resin body with laser light, to fix the dye adhered to the surface of the resin body on the resin body;

an oven fixing device configured to heat a whole of the resin body to which the dye is transferred by the transfer device, to fix the dye adhered to the surface of the resin body on the resin body;

a laser-applied transport path through which the transport unit including the resin body, to which the transfer device completes the transfer of the dye and on which the dye is to be fixed by the laser fixing device, is transported;

an oven-applied transport path through which the transport unit including the resin body, to which the transfer device completes the transfer of the dye and on which the dye is to be fixed by the oven fixing device, is transported;

a distribution unit configured to distribute the transport unit, for which the transfer of the dye by the transfer device is completed, to either the laser-applied transport path or the oven-applied transport path; and a controller configured to control the dyeing system and make a determination as to whether the distribution unit distributes the transport unit to the laser-applied transport path or the oven-applied transport path.

2. The dyeing system according to claim 1, wherein the transport device is configured to automatically transport the transport unit to the laser fixing device through the laser-applied transport path.

3. The dyeing system according to claim 1, wherein the controller is configured to acquire a condition of a dyeing step for each transport unit and control driving of the distribution unit in accordance with the acquired condition, to distribute the transport unit to either the laser-applied transport path or the oven-applied transport path.

4. The dyeing system according to claim 3, wherein the controller is configured to distribute the transport unit in accordance with a condition whether at least one of the resin body included in the transport unit and a color planned to be dyed on the resin body is suitable for fixing the dye by the laser fixing device.

5. The dyeing system according to claim 3, wherein the controller is configured to distribute the transport unit in accordance with whether a period of time required for performing a fixing step by the laser fixing device is equal to or shorter than a threshold.

6. The dyeing system according to claim 3, wherein the controller is configured to distribute the transport unit in accordance with an operation state of the laser fixing device.

7. The dyeing system according to claim 3, further comprising:

a reading unit configured to read information related to the transport unit, wherein the controller is configured to acquire a condition of a dyeing step for each transport unit based on the information read by the reading unit and control driving of the distribution unit in accordance with the acquired condition, to distribute the transport unit to either the laser-applied transport path or the oven-applied transport path.

8. The dyeing system according to claim 1, further comprising:

a color information measuring instrument configured to measure color information of the resin body on which the dye is fixed, wherein the color information measuring instrument is configured to measure color information of both the resin body on which the dye is fixed by the laser fixing device and the resin body on which the dye is fixed by the oven fixing device.

* * * * *